US009830461B2

(12) United States Patent
Rebaud et al.

(10) Patent No.: US 9,830,461 B2
(45) Date of Patent: *Nov. 28, 2017

(54) MEDIA SERVICE DELIVERY SYSTEM PROVIDING CONDITIONAL ACCESS TO MEDIA CONTENT FROM VARIOUS CLIENT DEVICES (71) Applicant: Intel Corporation, Santa Clara, CA (US)

(72) Inventors: Sylvain P. Rebaud, San Francisco, CA (US); Niranjan Nagar, Pleasanton, CA (US); Timothy R. Bratton, Los Altos, CA (US); Sean Ryan, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 507 days.

This patent is subject to a terminal disclaimer.

(21) Appl. No.: 14/288,264

(22) Filed: May 27, 2014

(65) Prior Publication Data

US 2014/0283137 A1    Sep. 18, 2014

Related U.S. Application Data (63) Continuation of application No. 13/412,375, filed on Mar. 5, 2012, now Pat. No. 8,738,789, which is a
(Continued)

(51) Int. Cl.
G06F 15/16    (2006.01)
G06F 21/60    (2013.01)
(Continued)

(52) U.S. Cl.
CPC .............. *G06F 21/60* (2013.01); *G06F 21/10* (2013.01); *G06Q 30/00* (2013.01)

(58) Field of Classification Search
CPC .......... G06F 21/60; G06F 21/10; G06F 30/00
See application file for complete search history.

(56) References Cited

U.S. PATENT DOCUMENTS 6,233,618 B1   5/2001  Shannon
6,947,995 B2   9/2005  Chang et al.
(Continued)

FOREIGN PATENT DOCUMENTS

WO    2004/077267 A2    9/2004
WO    2004/077267 A3    10/2006

OTHER PUBLICATIONS

Notice of Allowance received for U.S. Appl. No. 10/786,891, dated Nov. 3, 2011, 5 pages.
(Continued)

*Primary Examiner* — Moustafa M Meky
(74) *Attorney, Agent, or Firm* — Patent Capital Group (57) ABSTRACT

A device identifier (ID) is received that is associated with a request by a particular device to access media content hosted by a system remote from the particular device, the device ID being a device ID of the particular device. Based on the device ID, one or more capabilities of the particular device are determined relating to use of the media content. Access to the media content is based on the one or more capabilities of the particular device.

20 Claims, 3 Drawing Sheets

Related U.S. Application Data continuation of application No. 10/786,891, filed on Feb. 24, 2004, now Pat. No. 8,131,865.

(60) Provisional application No. 60/450,119, filed on Feb. 24, 2003.

(51) Int. Cl.
*G06F 21/10* (2013.01)
*G06Q 30/00* (2012.01)

(56) References Cited

U.S. PATENT DOCUMENTS

| | | | |
|---|---|---|---|
| 7,080,152 | B2 | 7/2006 | Bodin et al. |
| 7,089,246 | B1 | 8/2006 | O'Laughlen |
| 7,137,143 | B2 | 11/2006 | Chawla et al. |
| 7,222,162 | B2 | 5/2007 | Lee et al. |
| 7,246,228 | B2 * | 7/2007 | Sato ............... G06F 21/10 709/220 |
| 7,356,848 | B1 | 4/2008 | Duffield et al. |
| 7,392,393 | B2 | 6/2008 | Taki |
| 7,500,188 | B1 | 3/2009 | Trapani et al. |
| 7,580,988 | B2 | 8/2009 | Rudd |
| 8,131,865 | B2 * | 3/2012 | Rebaud ............ G06F 21/10 709/229 |
| 2001/0042107 | A1 | 11/2001 | Palm |
| 2001/0047377 | A1 | 11/2001 | Sincaglia et al. |
| 2002/0007349 | A1 | 1/2002 | Yuen |
| 2002/0040401 | A1 | 4/2002 | Yasushi et al. |
| 2002/0078144 | A1 | 6/2002 | Lamkin et al. |
| 2002/0107973 | A1 | 8/2002 | Lennon et al. |
| 2003/0133576 | A1 | 7/2003 | Grumiaux |
| 2003/0172271 | A1 | 9/2003 | Silvester |
| 2004/0006621 | A1 | 1/2004 | Bellinson et al. |
| 2004/0024860 | A1 * | 2/2004 | Sato ............... G06F 21/10 709/223 |
| 2004/0148408 | A1 | 7/2004 | Nadarajah |
| 2005/0154883 | A1 | 7/2005 | Itkis |
| 2006/0235797 | A1 * | 10/2006 | Lee ............... G06Q 30/02 705/50 |
| 2008/0222695 | A1 | 9/2008 | Itkis |
| 2008/0250458 | A1 | 10/2008 | Roman |
| 2009/0089398 | A1 | 4/2009 | Lambert |
| 2009/0217055 | A1 * | 8/2009 | Sham ............... G11B 20/00 713/189 |

OTHER PUBLICATIONS

Office Action received for U.S. Appl. No. 10/786,891, dated Sep. 24, 2009, 6 pages.
Office Action received for U.S. Appl. No. 10/786,891, dated Apr. 29, 2010, 7 pages.
Notice of Allowance received for U.S. Appl. No. 10/786,891, dated Oct. 7, 2010, 5 pages.
Office Action received for U.S. Appl. No. 10/786,891, dated Apr. 21, 2011, 7 pages.
Office Action received for U.S. Appl. No. 10/786,891, dated Apr. 27, 2011, 6 pages.
Response to Office Action received for U.S. Appl. No. 10/786,891, dated Dec. 24, 2009, 12 pages.
Response to Office Action received for U.S. Appl. No. 10/786,891, filed Jul. 29, 2010, 13 pages.
Response to Office Action received for U.S. Appl. No. 10/786,891, filed Oct. 20, 2011, 17 pages.
Supplemental Response or Supplemental Amendment to Office Action received for U.S. Appl. No. 10/786,891, filed Nov. 29, 2010, 10 pages.
Notice of Allowance received for U.S. Appl. No. 13/412,375, dated Jan. 15, 2014, 7 pages.
Office Action received for U.S. Appl. No. 13/412,375, dated Sep. 24, 2013, 6 pages.
Office Action received for U.S. Appl. No. 13/412,375, dated Jan. 17, 2013, 10 pages.
Response to Office Action received for U.S. Appl. No. 13/412,375, filed Jun. 17, 2013, 8 pages.
Response to Office Action received for U.S. Appl. No. 13/412,375, filed Dec. 24, 2013, 6 pages.
International Preliminary Report on Patentability and Written Opinion received for PCT Patent Application No. PCT/US2004/005593, dated Sep. 19, 2006, 7 pages.
International Search Report and Written Opinion received for PCT Patent Application No. PCT/US2004/005593, dated Aug. 4, 2006, 4 pages.

\* cited by examiner

MEDIA SERVICE DELIVERY SYSTEM PROVIDING CONDITIONAL ACCESS TO MEDIA CONTENT FROM VARIOUS CLIENT DEVICES

CROSS REFERENCE TO RELATED APPLICATIONS

This application claims the benefit of priority to U.S. patent application Ser. No. 13/412,375, filed Mar. 5, 2012, which claims the benefit of priority to U.S. patent application Ser. No. 10/786,891, filed Feb. 24, 2004, which claims the benefit of priority to U.S. Provisional Application No. 60/450,119, filed Feb. 24, 2003. Each of U.S. patent application Ser. No. 13/412,375, U.S. patent application Ser. No. 10/786,891, and U.S. Provisional Application No. 60/450,119 are hereby incorporated by reference in their entirety.

BACKGROUND

Field of the Invention

This invention relates generally to delivery of media to one or more media rendering client devices, and in particular to providing conditional access to media content received by media rendering client devices from a remote media service provider.

Background of the Invention

Digital is rapidly replacing analog as the preferred format for the storage, transfer, and processing of media data in many applications. In the home, for example, a growing number of devices are equipped to receive and render digital media. This enables the media content represented by the media data to be played on an output device, stored on a medium, or transmitted to another device. Some of the common media rendering devices used in the home include digital-ready televisions and set-top boxes, DVD/CD players and recorders, stereo receivers, and personal computers—just to name a few.

The media content rendered in these media rendering devices can come from a variety of sources. Traditionally, as with music CDs and video DVDs, media content is purchased on a physical medium and then directly loaded onto these devices. But in addition to the traditional approach, many consumers are discovering the advantages of joining an audio and/or video subscription service. In a typical subscription service, a consumer pays a small fee to receive media content from a remote media service provider, for example using a personal computer connected to the Internet. The consumer may then render and play the received media data on the computer or on a device networked with the computer. Subscription services thus take further advantage of the abilities of digital media.

Subscription services are enhanced by the addition of a home network. Home networking systems, such as that described in the Universal Plug and Play (UPnP) standard, offer many advantages for connecting devices within a home-networked environment. By incorporating a subscription service with a home network, subscribers can receive media for any of the devices on their home network—not just for their personal computers. This offers tremendous flexibility in the way that subscribers can use their media; however, the increased flexibility brings concerns about security and the digital rights of the media content owners.

A major concern that media content owners have about subscription services is how to protect their content from unauthorized use and copying. For example, a subscriber may pay a fee to listen to a song once, but that fee may not entitle the subscriber to make a copy of the song. But with the advances in home networking, the media owners may not know whether their media is being delivered to a networked stereo system or to an attached CD burner. As such, there is no way to ensure that the delivered media is not being used for an unauthorized purpose, such as copying.

Although the importance of protecting media content is well understood, the industry has not developed a system that can adequately protect media content for a media or multimedia provider service. For example, some content protection schemes use encryption to secure the transmission of media data, but these schemes do not enable the approval by a system server for conditional access and authentication of particular media rendering devices. Accordingly, there is no safeguard in existing systems to prevent media data from being transmitted to unapproved devices and used in a way not authorized by the media owners, so a large hole remains in existing protection schemes. The need still exists, therefore, for a system that allows for protection of content delivered by an audio or video subscription service or other media provider service.

SUMMARY OF THE INVENTION

A system for protecting the digital rights of content owners allows digital media to be delivered to media rendering client devices that have been approved for the media content. Before delivering requested media, the media service provider determines whether the media rendering client device that requested the media is the type of device that is authorized to receive the request media. If it is, the media service provider transmits the media to a middleman server over a network (such as the Internet). The middleman server then serves the media to the client device over a local network. By allowing the media content to be distributed to approved devices (e.g., to a stereo receiver, but not to a CD burner), the media service provider can prevent a user from using the media in a way that is not authorized by the content owner.

In one embodiment, a media delivery system operates a system server that handles requests for media items from one or more users of the service. Each user has a number of media rendering devices and a middleman server on a local network, where the middleman server may be remotely connected to the system server over a network, such as the Internet. In this way, the user can request a media item using a media rendering device, and the middleman sever relays that request to the system server. The media rendering devices also communicate a device identification (ID) to the system server, where the device ID identifies the media rendering device that made the request. Using the device ID, the system server can verify whether the media rendering device that requested the media item is approved to receive the requested media item. For requests in which the media rendering device is approved to receive the requested media item, the system server transmits the requested media item to the associated middleman server, which in turn delivers the media item to the media rending device.

In another aspect of an embodiment of the invention, the media service delivery system can be used to set limits on the content that media rendering client devices can receive based on the rating of the content. In this way, a user can prevent content having a certain rating (such as PA-rated audio content or R-rated video content) from being delivered to particular client devices (such as a child's stereo or television). In one embodiment, the system server obtains a rating associated with a requested media item and accesses an approved rating range for the media rendering device that requested the media item. If the requested media item has a rating outside the approved rating range, the system server denies the device's request. The system may also include a user interface that allows users to set and modify the approved rating ranges associated with each of their media rendering devices.

In another aspect of an embodiment of the invention, the media service delivery system offers a number of different pricing schemes for delivering particular media content to particular client devices associated with a user. The various pricing schemes enabled by the system include the ability to set different prices based on which media rendering devices have access to protected media content and the ability to set prices based on the maximum number of simultaneous sessions by which media rendering devices can obtain content.

DETAILED DESCRIPTION OF THE PREFERRED EMBODIMENTS

A media service delivery system enables the delivery of media content to one or more users while protecting the media from being used in an unauthorized way. For example, a media service provider can use this system to implement a subscription service, where a user pays for access to media content provided by the media service provider. The system protects the media content by allowing the service provider to limit the subscriber's access to the media. To illustrate how this may be done, the service provider may designate certain media items to be freely downloaded and copied, while other media items may be designated to be played only by the subscriber. Accordingly, the system disallows delivery of the protected media items to client devices that are capable of copying the media or some other unauthorized use.

Figure 1:
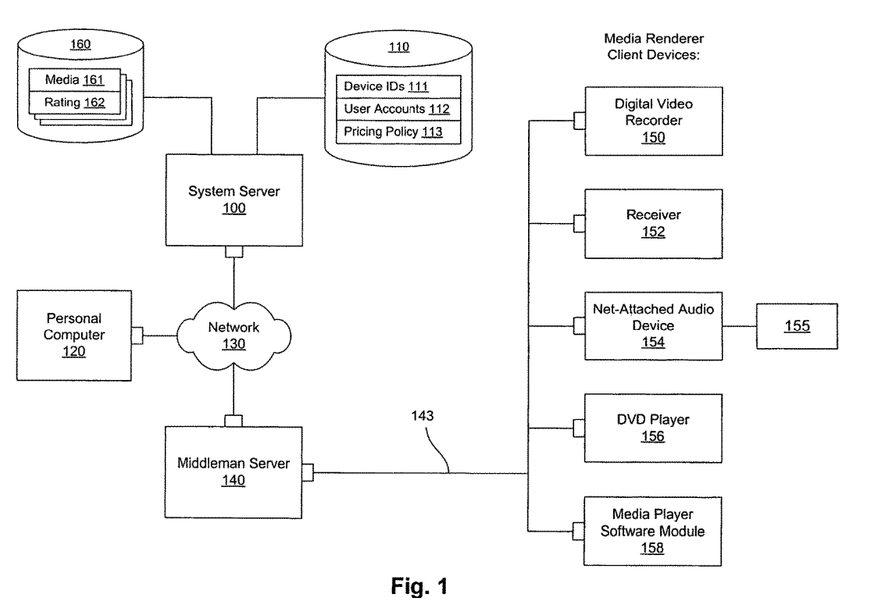
FIG. 1 is a system diagram of a media delivery system in accordance with an embodiment of the claimed subject matter.

FIG. 1 shows a media deliver system in accordance with one embodiment of the invention. The media delivery system includes a system server 100, a middleman server 140, and a personal computer 120, and a number of media rendering client devices 150-158. The system server 100 communicates over a network 130, such as the Internet, with the middleman server 140 and the personal computer 120. The middleman server 140 in turn communicates over a local network 143, such as a LAN, with the media rendering client devices 150-158. In one embodiment, the middleman server 140, is implemented on a computer system or other electronic device. Moreover, as used herein, servers (including the middleman server 140) may comprise both the hardware and software or just the software that performs the operations described.

In one application of the media delivery system, a media service provider maintains and controls the system server 100, while a user or subscriber to the service owns and controls the middleman server 140, the local network 143, and the client devices 150-158. Although only one middleman server 140 is in communication with the system server 100 as shown in FIG. 1, it can be appreciated that any number of middleman servers 140 can be connected to the system server 100 over the network 130. Therefore, this media delivery system is readily scalable so that the service provider can accommodate any number of users that have access to the network 130. In a typical application, there could be a large number of users that access the system server 100 by way of their middleman server 140, each user having the ability to receive media content from the media service provider.

The system server 100 is in communication with a service management database 110, which can also be controlled and maintained by the service provider. The database 110 is used to manage the media delivery service for each of the users that are members of that service. In one embodiment, the database 110 contains a list of approved device IDs 111, account information 112 for each of the users, and a pricing policy 113. As will be explained in greater detail, the list of approved device IDs 111 contains an identification of the media rendering client devices that are approved for the delivery of particular media content. The account information 112 contains data for managing the account access, preferences, and status for each of the members of the service. The pricing policy 113 identifies the prices of particular media content or a set of rules or policies for determining the pricing of media content, offering a great amount of flexibility to the media service provider in providing pricing options to the user.

The system server 100 also communicates with one or more media content databases 160, from which the system server 100 obtains the media items 161 for delivery. The media content databases 160 may be operated and maintained by the media service provider, or they may be operated and maintained by the media content owners—which are often not the same entity. In one embodiment, the media items 161 are associated with a rating 162, if available. Ratings 162 vary depending on the type of media content. For example, music that may be objectionable contains a PA (parental advisory) rating, and movies are rated according to a G, PG, PG-13, and R rating scheme.

Middleman server 140 communicates with the media rendering client devices 150-158 over a local network 143, such as a Local Area Network (LAN). The media rendering client devices 150-158 may include any devices that are capable of receiving and processing digital media, and they may be electronic devices or software modules running on a computer system. Rendering media content may include one or more of decoding, playing, displaying, running, executing, processing, and retransmitting of the media. As illustrated in FIG. 1, example media rendering devices include a digital video recorder 150, a receiver 152, a net-attached audio device 154, a DVD player 156, and a media player software module 158; however, this list is not meant to be exhaustive in any way. In one example, the net-attached audio device 154 renders the digital media received and retransmits it as an analog media signal to another device.

Figure 3:
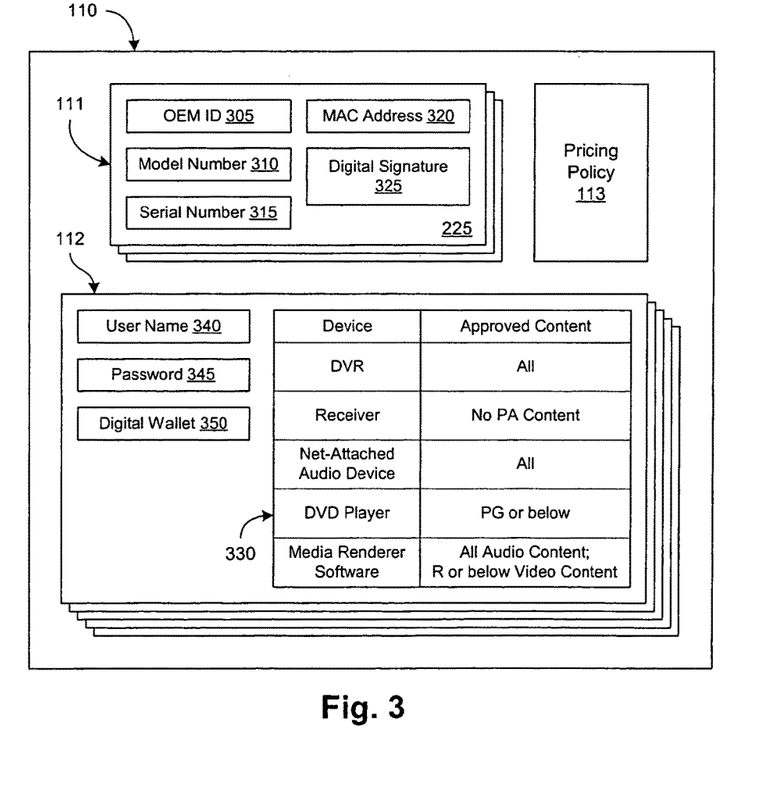
FIG. 3 is a diagram of the service management database 110 of FIG. 1, in accordance with an embodiment of the claimed subject matter.

The personal computer 120 provides an interface for the user to access the media delivery service to manage the user's account. In one embodiment, this interface includes a graphical user interface, software modules, and application programming interfaces (APIs) that allow a user to access and manage the user's account information remotely over the Internet. From the personal computer 120, a user may log onto the system server 100 as well as manage the user's account information 112, pay for service fees, and sign up for additional services. A user's account information may include a user name 340 and password 345 for logging into the system, a digital wallet 350 for keeping an account balance and payment options, and any other information needed to manage the user's account with the media service (as shown in FIG. 3).

The personal computer 120 may be the same computer system as the middleman server 140, or it may be any computer coupled to the network 130. In this way, a user may access the user's account from anywhere on the network 130, e.g., from any computer having a connection to the Internet. Alternatively, the personal computer 120 may be connected to the system on the local network 143 and communicate with the system server 100 through the middleman server 140. In another alternative embodiment, a network-enabled electronic device can be used in place of the personal computer 120 to allow a user to access the account over the network 130.

To protect the security of the media content delivered to the user, it is desirable to implement a secure transmission of the media content over the network 130 and over the local network 143. Securing communications over the network 130 protects media from being acquired by unauthorized persons and protects sensitive personal information communicated by a user to the service provider. This helps to protect the media content and the user's personal information from hackers. Securing transmissions over the local network 143 helps to prevent one client device from intercepting content that is sent in the clear and meant for another client device. For example, it may be desirable to prevent the digital video recorder 150 from receiving video content delivered to the DVD player 156 if that video content is not allowed to be copied.

There are a number of known techniques to implement secure transmissions over the network 130 and local network 143. In one embodiment, a security layer on the network 130 and/or the local network 143 provides a secure channel of communication. It is understood that there are many ways to implement a secure communications channel. The security layer can be achieved using https, SSL, PPK encryption of packets transmitted over the network, or any other suitable technique. In another embodiment of the invention the media data are encrypted before being sent from the system server 100 to the middleman server 140 and from the middleman server 140 to a media rendering client device 150-158.

Figure 2:
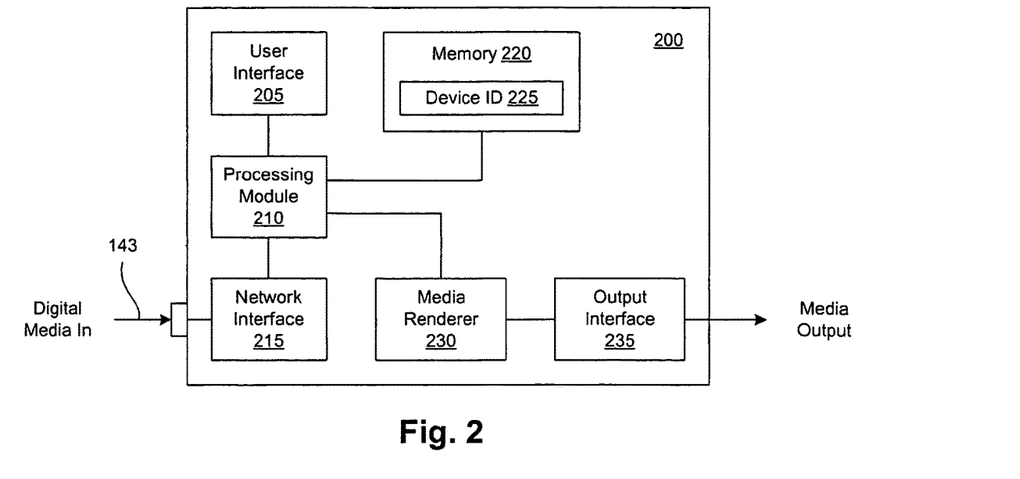
FIG. 2 illustrates an example of one type of media rendering client device 200, in accordance with an embodiment of the claimed subject matter.

FIG. 2 illustrates one example of a media rendering client device 200. However, it should be understood that a great variety of media rendering devices exist and continue to be developed. As such, the device 200 is provided for illustration purposes only and is in no way intended to limit the scope of the types of devices that can be used with the media delivery system. In one embodiment, media rendering device 200 comprises a user interface 205, a processing module 210, a network interface 215, a memory 220, a media renderer 230, and an output interface 235.

To obtain a media item using the device 200, a user navigates the device's user interface 205 to locate and request a media item on the local network 143. The device 200 communicates with remote systems over the local network 143 using the network interface 215, which can send media requests and receive media data. The device 200 routes received digital media to the media renderer 230, which processes the digital data and produces an appropriate output, which is in turn handled by the output interface 235. For example, if the device 200 were a digital-enabled television, the media renderer 230 would decode the received video data and the output interface 235 would use the decoded data to draw frames on the display screen. Alternatively, if the if the device 200 were a stereo receiver, the media renderer would decode the audio data into an analog signal and the output interface would amplify the signal and provide an electrical interface for an attached speaker system.

As described above, the media service delivery system authenticates the media rendering device 200 using a device ID 225 associated with the device 200. In one embodiment, the device ID 225 is stored in each device's memory 220. The device ID 225 may uniquely identify a particular device, uniquely identify the type of device (e.g., the manufacturer and model), or uniquely identify a class of devices that share a common trait. In a simplified system, all approved devices may have the same device ID 225 (e.g., where the device ID 225 is merely a piece of information that shows the device has been approved). Accordingly, in various embodiments, the device ID 225 (also illustrated in FIG. 3) includes one or more of the following fields or data items:

OEM ID 305, which identifies the manufacturer of the device 200.

Model number 310, showing the particular model of the device 200.

Serial number 315, which corresponds to a manufacturer's serial number and can be used to uniquely validate a manufacturer's product.

MAC address 320, or a portion thereof, which is unique for each manufactured product and can be thought of as a serial number for network-enabled devices.

Digital signature 225, which corresponds to a predetermined digital string that allows for a consistent identification of authorized devices.

It can be appreciated that any number of the above data items, alone or in combination with other information, can be used to identify the device depending on the desired scheme for providing conditional access to media for the different devices.

One benefit of using a digital signature 225 is that it may be protected by a copyright or other intellectual property right. In this way, the media service provider has a legal recourse to prevent unscrupulous device manufacturers from making devices that would spoof the system. For example, a manufacturer of CD burners might try to include the device ID of an approved digital receiver by including a field in its memory that copies the approved device's MAC address or other unique information. However, the unscrupulous manufacturer could be legally prevented form including a protected digital signature, thereby preventing any spoofing of approved devices.

In one implementation of the system, a media service provider works with various device manufacturers to approve the manufacturers' media rendering client devices for use with the media service delivery system. As described above, to protect the digital rights of the owners of the media content, it may be desirable to prevent certain media content that is delivered by the system from being digitally copied. To prevent devices that can copy digital media from having access to the service, the media service provider reviews various media rendering devices and determines whether the device should be approved. For example, a stereo receiver that outputs analog signals for a speaker system might be approved, whereas a stereo receiver that also has a digital output may not be. Alternatively, a manufacturer may design a receiver that can output digital media when the source is a CD, but not when the source is the media service provider. If the media service provider is satisfied that such a device cannot be easily hacked or altered to defeat this protection mechanism, the service provider may approve the device. In this way, the media service provider can use a pre-approval process to obtain the desired level of security to prevent any type of device from having access to the provider's service.

In one embodiment, a list 111 of approved device IDs 225 is stored in the service management database 110 coupled to the system server 100. By communicating with the database 110, the system server 100 can verify whether a requesting device should have access to a particular media item given the device's device ID. FIG. 3 illustrates one embodiment of the service management database 110. As described above, each device ID may include one or more of OEM ID 305, model number 310, serial number 315, MAC address 320, and digital signature 325, or any other identifying information.

The media service delivery system may also allow for different levels of security or access rules to be applied to different sets of media content. For example, a subscriber may have paid for the full rights to copy a first category of audio content (such as an album) and also paid for a subscription service that provides the right to listen to but not copy the audio content. In one embodiment, this feature is implemented by maintaining a separate list 111 of approved device IDs for each category of media content. Accordingly, in the example the first category would have a first list of approved devices, which would generally include CD burners and other devices that allow for digital reproduction of the content. A second list of approved devices would be maintained for the other content, which would not include such devices. Then, when determining whether a device is allowed to access a particular media item, the delivery system uses the appropriate list 111 of approved devices depending on the media content that has been requested.

Figure 4:
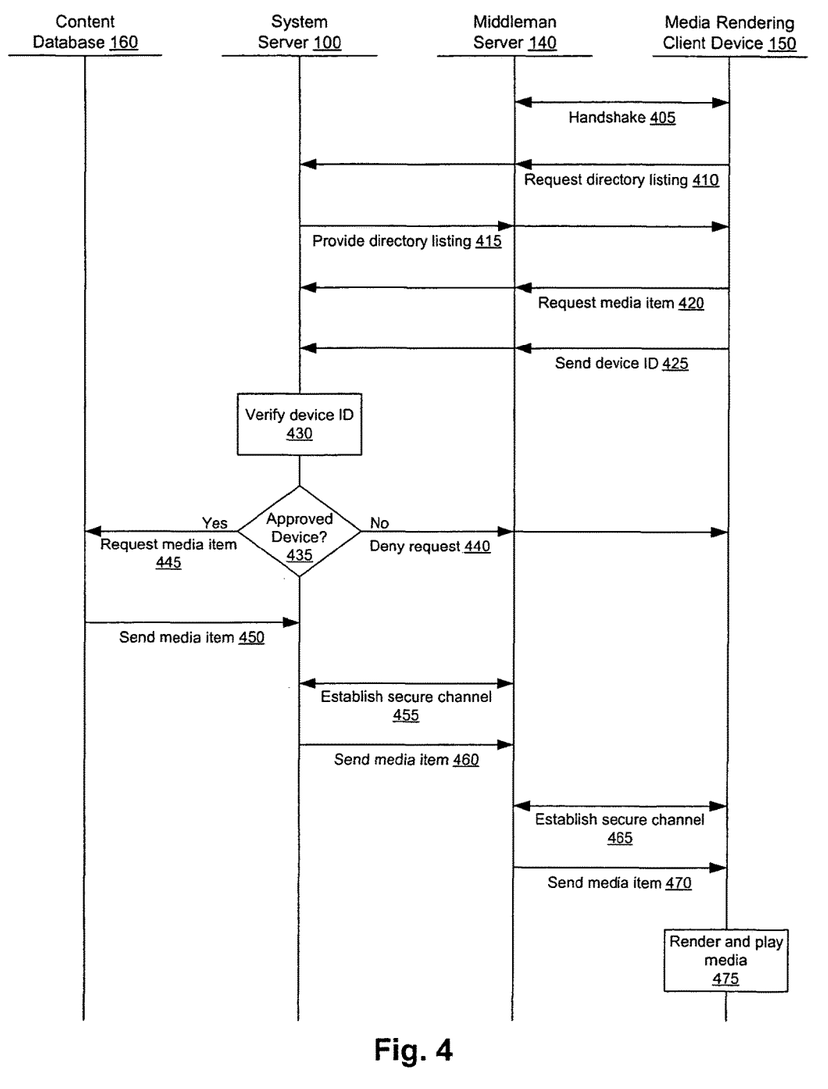
FIG. 4 is a trace diagram showing the operation of the media service delivery system in accordance with an embodiment of the claimed subject matter.

The trace diagram of FIG. 4 illustrates one embodiment of a process by which a media rendering client device 150 can be used to obtain a media selection from the system server 100 by way of the middleman server 140, in accordance with an embodiment of the media service delivery system. As explained above, the media rendering client device 150 communicates with the middleman server 140 over the local network 130. This can be home network, for example a home network as described in the Universal Plug and Play (UPnP) standard. To begin a communication session, the client device 150 and middleman server 140 undergo a handshaking process 405.

Once a communications session is established, and before making a media request, the client device 150 may request 410 a directory listing of available media content, and the middleman server 140 passes this request to the system server 100. To reduce network traffic, the client device 150 may store previous directory listings and merely request an update for the listing. In response to the request, the system server provides 415 a directory listing of the available media content, which the middleman server 140 passes to the client device 150. In this way, the client device 150 can obtain a listing of available media content from the media service provider, displayed for example on the device's user interface 205.

In one embodiment, the system server 100 provides a listing of only the media content that is available to that device 150. To do so, the system server 100 could cross-reference the device 150 with the list 111 of approved devices to determine which content can be received by the device 150; however, it may not be necessary to perform a full verification process (described below) for a listing, since the security concerns for the directory listing are not as great as those for the content itself. In addition, the directory listing preferably includes only the type of media content for which the device 150 is designed (e.g., provide a directory of audio content only for an audio device). In one embodiment, the directory listing is a CDS (content directory service) for UPnP.

Using the client device 150, the user may then request 420 a media item, such as one from the directory listing. When the media rendering client device 150 requests 420 media, the middleman server 140 relays the request to the system server 100. In addition, the client device 150 sends 425 its device ID 225 to the system server 100 by way of the middleman server 140. The client device 150 may send 425 the device ID 225 along with the media request, or it may do so in response to a query from the middleman server 140 or system server 100.

Having received the media request from a client device 150 and the device ID 225 associated with that device 150, the system server 100 verifies 430 that the device 150 is allowed to receive the media item that it requested. To perform this verification, the system server 100 compares the device ID 225 against the list 111 of approved device IDs in the database 110. If 435 the device 150 has not been approved for the requested content, the system server 100 denies 440 the request. If 435 the device 150 has been approved, however, the system server 400 proceeds with granting the request. To grant the request, for example, the system server 100 requests 445 the media item from the media content database 160, which sends 450 the media item to the system server 100.

Preferably, the system server 100 and middleman server 140 establish 455 a secure communications channel, as described above. Securing communications between the system server 100 and the middleman server 140 protects the media content from being intercepted by unauthorized persons and also protects potentially sensitive information about the user's account. The secure communications channel may be established 455 at the beginning of the session between the system server 100 and the middleman server 140. The system server 100 then sends 460 the requested media item to the middleman server 460.

Similarly, the middleman server 140 and the media client rendering device 150 establish 465 a secure communications channel. As noted above, this step can be performed earlier in this process. Securing communications between the middleman server 140 and the client device 150 protects the media item from being intercepted by other client devices on the network 143 that have not been approved for the content. The middleman server 140 then sends 470 the requested media item to the client device 150, which can render 470 the media item so that it can be played or further processed for the user's experience.

In another embodiment, the media service delivery system can be configured to deliver media content to a user's media rendering client devices conditionally based on the ratings associated with the media content. Referring to FIG. 3, each user's account information 112 includes a device map 330. The device map 330 has a listing of each of the client devices 150-158 that the user has attached to the user's local network 143. This listing may be detected automatically by inquiries from the system server 100, or the user may register these devices manually with the system server 100 using the personal computer 120 as an interface to configure the device map 330. Associated with each device in the device map 330 is an approved content field, which describes the ranges of ratings that each device can access. As ratings for various types of media content can vary, so can the approved content field.

Accordingly, with the device map 330 the user can specify which content is accessible to each device by appropriately designating a range in the approved content field. For example, if the user wishes to provide full access to all content in the service to DVR 150, the user simply sets the approved content authorization associated with the DVR 150 to "All." This enables the DVR 150 to access all the content in the database 160 to the extent the content is available to that device. Similarly, the user can set the approved content authorization for receiver 152 to a restricted access level. This might be desirable, for example, if the receiver 152 is a boom box located in a child's room, and the user wants to deny access to PA-rated music. It should also be appreciated that this would be useful if the user wanted to limit access for the DVD player 156 to movies that contain ratings of PG or below. Additionally, devices like the media player software module 158 may be able to access multiple types of content, such as audio and video content. In such cases, the approved content field may contain approved rating ranges for each type of media content.

In one embodiment, the system server 100 implements the feature of conditional delivery based on media content rating during the authorization step 430 of FIG. 4. In addition to verifying the device ID 225 in the list 111 of approved device IDs, as described above, the system server also verifies whether the device requesting a media item 161 is authorized to view content having that item's rating 162. To verify this, the system server 100 locates the entry in the device map 330 and retrieves its associated approved content range. The system server only grants the request if the rating 162 for the media item 161 is within the approved content range.

As FIG. 1 illustrates, the media content database 160 includes the ratings 162 associated with the media items 161 therein. Therefore, the system server 100 can obtain a media item's rating 162 from the content database 160. Each media item 161 in the content database 160 is rated according to the appropriate method for that type of content. For instance, music that may be objectionable contains a PA (parental advisory) flag, and movies are rated according to a G, PG, PG-13, and R rating scheme. Alternatively, rather than obtain the rating 162 from the media content database 160, the system server 100 may associate the rating 162 with a media item 161 in some other way, for example, by reference to an external database.

The media service delivery system described herein allow a great variety in pricing schemes for the media service provider. In one example, the media service could be priced at a basic subscription fee per month for access from a personal computer only. If the user would like the ability to access the media service from other devices, such as a digital video recorder 150, the user can include that device in his account for an additional fee. Additional devices could also be added to the user's account for additional fees. In an alternative pricing scheme, a basic rate may allow for a single media session to be opened by a client rendering device at a given time, and the user can pay additional fees to allow additional simultaneous sessions. With this system, therefore, pricing can be set by any kind of pricing policy 113, which is accessible by system server 100

As used herein, media items and media data may include information used to represent a media or multimedia content, such as all or part of an audio and/or video file, a data stream having media content, or a transmission of media content. Media content may include one or a combination of audio (including music, radio broadcasts, recordings, advertisements, etc.), video (including movies, video clips, television broadcasts, advertisements, etc.), software (including video games, multimedia programs, graphics software), and pictures; however, this listing is not exhaustive. Furthermore, media data, media items, and media content include anything that itself comprises media content, in whole or in part. Media data, media items, and media content can be encoded using any encoding technology, such as MPEG in the case of video and MP3 in the case of audio. They may also be encrypted to protect their content using an encryption algorithm, such as DES, triple DES, or any other suitable encryption technique.

In addition, any of the steps, operations, or processes described herein can be performed or implemented with one or more software modules, alone or in combination with other devices such as hardware devices. In one embodiment, a software module is implemented with a computer program product comprising a computer-readable medium containing computer program code, which can be executed by a computer processor for performing the steps operations, or processes described.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

We claim:

1. At least one machine accessible storage medium having code stored thereon, the code when executed on a machine, causes the machine to:
   identify a device identifier (ID) associated with a request by a particular device to access media content hosted by a system remote from the particular device, wherein the device ID comprises a device ID of the particular device;
   determine, based on the device ID, one or more capabilities of the particular device related to use of the media content; and
   determine whether to grant access to the media content based on the one or more capabilities of the particular device.

2. The storage medium of claim 1, wherein the media content comprises at least one of audio content and video content.

3. The storage medium of claim 1, wherein the request is for media content of a particular one of a plurality types and determining whether to grant the request is further based on the particular type.

4. The storage medium of claim 3, wherein access to the particular type of media content is restricted for devices possessing a particular type of capability.

5. The storage medium of claim 3, wherein each of the plurality of types corresponds to a respective set of access rules for media content of the respective type.

6. The storage medium of claim 1, wherein the one or more capabilities comprise outputting a signal corresponding to access of media content by the particular device.

7. The storage medium of claim 6, wherein the signal comprises a digital copy of media content accessed by the particular device and access to media content is restricted for devices capable of generating a digital copy of the media content.

8. The storage medium of claim 1, wherein the code, when executed, further causes the machine to receive the request to access the media content.

9. The storage medium of claim 8, wherein the code, when executed, further causes the machine to query the particular device for the device ID based on the request.

10. The storage medium of claim 9, wherein the code, when executed, further causes the machine to approve access to the media content by the particular device and provide access to the media content by the particular device.

11. The storage medium of claim 10, wherein the media content is provided to the particular device over a secure communications channel.

12. The storage medium of claim 10, wherein providing the access comprises one of enabling a download of the media content to the particular device and streaming of the media content by the particular device.

13. The storage medium of claim 8, wherein the request is received via a middleman system.

14. The storage medium of claim 13, wherein the request is received from the middleman over the Internet.

15. The storage medium of claim 14, wherein the middleman system is communicatively coupled to the particular device over a local network comprising the middleman system and the particular device.

16. The storage medium of claim 1, wherein access to the media content is granted to the particular device based on the device ID of the particular device, and the code, when executed, further causes the machine to:
identify another request for the media content from a second device;
identify a device ID of the second device;
determine, based on the device ID of the second device, one or more capabilities of the second device related to use of the media content; and
determine to deny access to the media content based on the one or more capabilities of the second device.

17. A method comprising:
identifying a device identifier (ID) associated with a request by a particular device to access media content hosted by a system remote from the particular device, wherein the device ID comprises a device ID of the particular device;
determining, based on the device ID, one or more capabilities of the particular device related to use of the media content; and
determining whether to grant access to the media content based on the one or more capabilities of the particular device.

18. A system comprising:
at least one processor device;
computer-readable memory;
a media delivery service to:
identify a device identifier (ID) corresponding to a request by a particular device to access media content hosted by a system remote from the particular device, wherein the device ID comprises a device ID of the particular device;
determine, based on the device ID, whether the particular device possesses capabilities to generate copies of the media content; and
determine whether to grant access to the media content based on whether the particular device possesses the capabilities.

19. The system of claim 18, wherein the media delivery service is further to serve a library of media content to a plurality of remote devices.

20. The system of claim 18, wherein the capabilities comprise a capability to generate a digital copy of the media content as an output.

* * * * *